(No Model.)
A. MACKEY.
Connection for Meters.
No. 230,882. Patented Aug. 10, 1880.
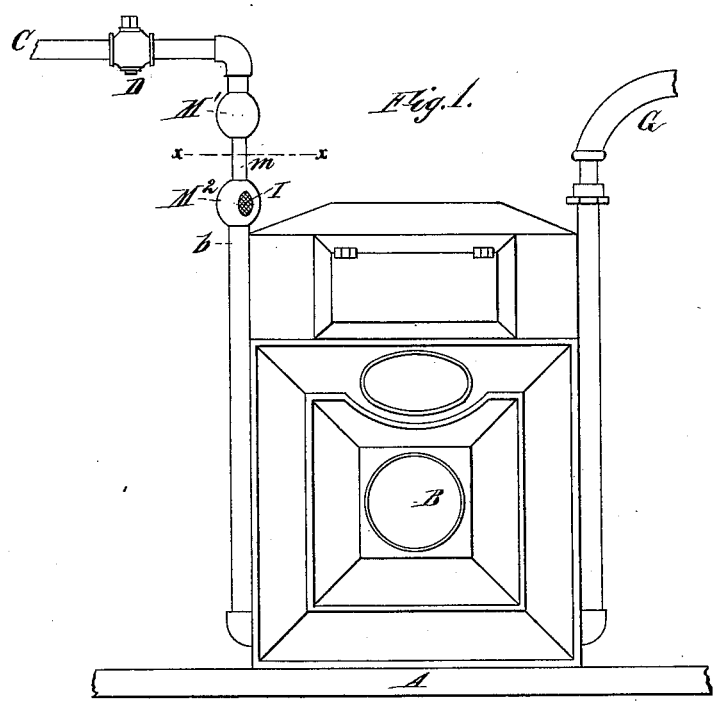
Fig. 1.
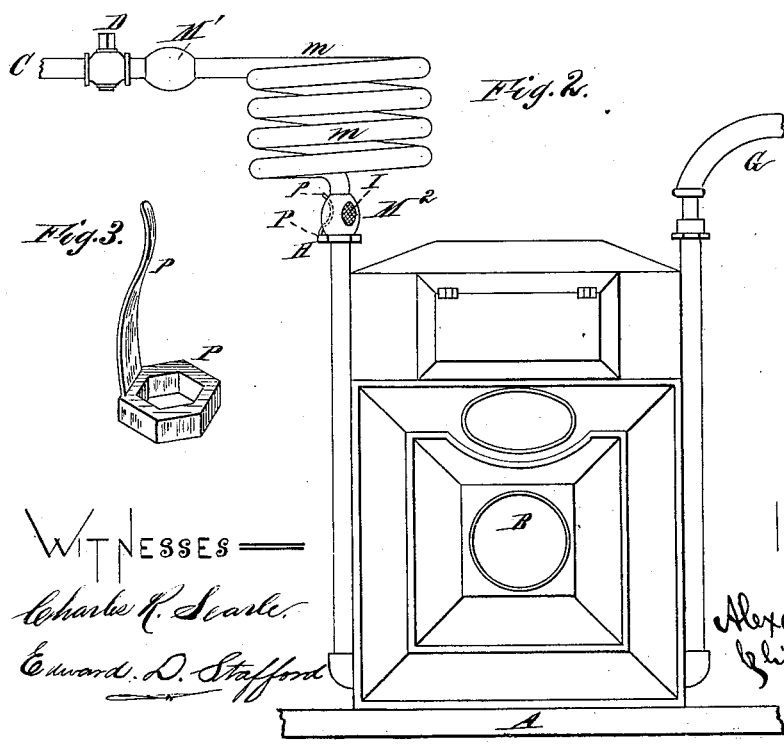
Fig. 2.
Fig. 3.
WITNESSES
Charles H. Searle
Edward D. Stafford
INVENTOR
Alexander Mackey
his attorney
F. L. Stetson

UNITED STATES PATENT OFFICE.

ALEXANDER MACKEY, OF NEW YORK, N. Y.

CONNECTION FOR METERS.

SPECIFICATION forming part of Letters Patent No. 230,882, dated August 10, 1880.

Application filed March 31, 1880. (No model.)

*To all whom it may concern:*

Be it known that I, ALEXANDER MACKEY, a citizen of the United States, residing in New York city, in the county and State of New York, have invented certain new and useful Improvements relating to Connections for Meters, of which the following is a specification.

My improvement is designed to apply to gas-meters, water-meters, and analogous meters generally.

The invention will be understood from the following specification and claim.

The following is a description of what I consider the best means of carrying out the invention.

The accompanying drawings form a part of this specification.

Figure 1 is a side elevation, showing the device with my locking-piece removed. The line $x$ $x$ indicates the saw-cut through the soft metal, by which a rapid disconnection is effected by the proper officer when required. Fig. 2 represents a like view with my locking-piece attached. Fig. 3 is a perspective view of such locking-piece detached.

Similar letters of reference indicate corresponding parts in all the figures.

I will assume that the fluid is gas.

A is a floor or shelf on which the meter rests, and B is the meter, which may be of any ordinary or suitable construction. C is the service-pipe conveying the gas from a street-main.

The meter is equipped with a permanently-attached nozzle, $b$. The pipe C terminates a little distance from the nozzle $b$. The space between is occupied by a lead pipe, $m$. One end of this lead pipe is secured to the service-pipe cock by soldering with what is known as a "wiped" joint, (marked M'.) The other end of the pipe $m$ is soldered to the nozzle $b$ of the gas-meter by another wiped joint, $M^2$.

The locking-piece P is hexagonal, or suitably formed to gripe and hold the pipe at the joint $M^2$, and is provided with a slender arm, $p$, which latter extends out parallel to the axis of the pipe, and is embedded in the material of the joint $M^2$ and secured by the seal I. If it is in any case inconvenient to embed the arm in the joint, the arm may be made sufficiently flexible to be held out of the way during the wiping of the joint and be afterward bent down upon the joint and sealed with wax, solder, or other material suitable for sealing.

D is a stop-cock, performing its ordinary functions in the service-pipe C. It may be near the meter, as represented, or at any desired distance. It must, of course, be open when the meter is working. It is closed whenever the meter is to be disconnected.

The junction of the meter to the pipe G, which supplies the house, may be made and broken by an ordinary screw-coupling or union, as there is no liability to fraud at that point.

To fit up my work the meter B is placed in position and connected as usual to the house-pipe G. Then I connect from the service-pipe cock C to the pipe $m$ by a soldered joint, M', and from the pipe $m$ to the nozzle $b$ of the meter by another soldered joint, $M^2$. At this joint my locking-piece P is attached to hold the pipes securely together.

To disconnect the meter requires only the ordinary appliances and any ordinary means for cutting or sawing off the pipe $m$. The fragments of material left after each operation must, of course, be cleared away in whole or in part before the next connection is made.

I claim as my invention—

In combination with a meter, B, the locking-piece P $p$, a screw-coupling or union, H, and a seal, I, adapted to serve as and for the purposes herein specified.

In testimony whereof I have hereunto set my hand at New York city, New York, this 29th day of March, 1880, in the presence of two subscribing witnesses.

ALEXR. MACKEY.

Witnesses:
JOS. W. TAYLOR,
M. HEINE.